US006624554B2

(12) United States Patent  (10) Patent No.: US 6,624,554 B2
Holzer  (45) Date of Patent: Sep. 23, 2003

(54) LIGHT FITTINGS FOR RETROFITTING LARGE-DIAMETER INDUCTIVE FLUORESCENT LAMPS TO SMALLER-DIAMETER ELECTRONIC T5-LAMPS

(75) Inventor: Walter Holzer, Meersburg (DE)

(73) Assignee: Provera GmbH, Meersburg (DE)

( * ) Notice: Subject to any disclaimer, the term of this patent is extended or adjusted under 35 U.S.C. 154(b) by 124 days.

(21) Appl. No.: 09/818,813

(22) Filed: Mar. 27, 2001

(65) Prior Publication Data

US 2001/0034148 A1 Oct. 25, 2001

(30) Foreign Application Priority Data

Mar. 27, 2000 (DE) .......................................... 100 14 773
Aug. 28, 2000 (DE) .......................................... 100 42 133

(51) Int. Cl.[7] .......................... H01R 33/02; H01R 33/08
(52) U.S. Cl. ............................ 313/318.01; 439/76.1; 439/226; 439/236
(58) Field of Search ........................ 313/318.01, 52, 313/318.06, 318.11, 318.12, 17, 21; 439/76.1, 226, 236, 611, 620; 362/457

(56) References Cited

U.S. PATENT DOCUMENTS

| 3,993,386 | A | * | 11/1976 | Rowe | 439/236 |
| 4,514,793 | A | * | 4/1985 | Andreasen | 362/306 |
| 4,563,729 | A | * | 1/1986 | Jendrewski | 362/218 |
| 4,753,603 | A | * | 6/1988 | Hafstad | 439/226 |
| 4,758,173 | A | * | 7/1988 | Northrop | 439/232 |
| 5,483,124 | A | * | 1/1996 | Kaviani | 315/86 |
| 5,489,813 | A | * | 2/1996 | Jung | 313/25 |
| 5,887,968 | A | * | 3/1999 | Logan | 362/241 |
| 5,904,415 | A |   | 5/1999 | Robertson et al. | 362/260 |
| 6,036,522 | A |   | 3/2000 | Holzer | 439/306 |
| 6,162,096 | A | * | 12/2000 | Klaus | 439/617 |

FOREIGN PATENT DOCUMENTS

| DE | 38 24 596 A1 | 1/1990 |
| DE | 43 28 923 A1 | 3/1995 |
| DE | 44 07 470 A1 | 9/1995 |
| DE | 197 07 048 A1 | 6/1998 |
| DE | 298 14 590 U1 | 11/1998 |
| DE | 198 54 440 A1 | 6/2000 |
| EP | 0 641 968 B1 | 3/1997 |

OTHER PUBLICATIONS

*Search Report* corresponding to German Patent Application Serial No. DE 100 14 773.9, filed Mar. 27, 2000, German Patent Office, dated Dec. 20, 2000, 4 pages.

* cited by examiner

*Primary Examiner*—Nimeshkumar D. Patel
*Assistant Examiner*—Anthony Perry
(74) *Attorney, Agent, or Firm*—Marshall, Gerstein & Borun LLP

(57) ABSTRACT

Fittings for adapting conventional fluorescent light fixtures to receive smaller-diameter T5 fluorescent tubes are described. The fittings include transparent tubes adapted to fit around the small-diameter T5 light, electronic components for supplying high-frequency current, and insulation caps having pins which correspond to the receptacle for the lamp that is being replaced.

13 Claims, 2 Drawing Sheets

LIGHT FITTINGS FOR RETROFITTING LARGE-DIAMETER INDUCTIVE FLUORESCENT LAMPS TO SMALLER-DIAMETER ELECTRONIC T5-LAMPS

BACKGROUND OF THE INVENTION

Flourescent lights or tubes are now available in a variety of lengths and diameters. The advent of improved electronics, interior phosphor coatings and internal gases have resulted in more efficient lighting systems. As a consequence, one can now achieve the same, or higher, lighting output from a much smaller fluorescent tube.

The diameter of a fluorescent tube is normally expressed as a "T" number, where each T unit represents one-eighth of an inch. Traditional fluorescent tubes bore a "T12" designation (i.e., 1.5 inches in diameter). These large-diameter lamps are gradually being replaced by smaller-diameter tubes, for example, the "T5" lamp which is 5/8 inches in diameter.

The special advantages of the new T5-Technology make it worthwhile to change the numerous lights, which were installed many years ago and which are, because of their cheap choke power supply units, not very efficient. The new T5-lamps, which function solely with electronic power supply units, will mean up to 40% reduction in the consumption of electricity.

However the new T5-lamps cannot be used as they are in existing apparatus. First there is a requirement for an electronic high-frequency power supply unit; however, about 80% of the currently installed lights still function with cheap, out-dated inductive power supply chokes. Secondly the T5-lamps are about 4 to 5 cm shorter and also have pins with a considerably smaller gap between them. For this reason the T5 lamps cannot be used in existing old light fixtures.

There are already adapter systems available which allow the change over from the old to new lamps but they are expensive and complicated.

SUMMARY OF THE INVENTION

The task of the invention is to offer a solution which can be understood and used even by every non-expert.

Anyone can install or change the old luminous lamps T12, T10 or T8. Therefore the solution of the invention lies therein that one creates a so-called semi-fitting, which looks practically the same and can also be handled in the same way as the previous lamps. The semi-fitting is used as a commonly familiar luminous lamp and secured by turning.

This is carried out in that one covers the new T5 lamp with an external tube, of about the same dimensions as the previous "old" lamp and, since they are shorter, one can either place insulation caps at the ends, which not only compensate for the difference in length, but are also provided with contact pins, which correspond to the old standards.

Since even T5 lamps have an end it is useful, to make at least one of the insulation caps removable with a tool, in order to change the lamps. The use can be simplified in that one provides funnel-shaped receptacles at the insulation caps, in order have easy access to the pair of plug contacts of the semi-light fitting.

The attachment of the funnel-shaped receptacles on the printed circuit boards is also useful especially if the funnels can be attached on the printed circuit boards at different intervals, in order to adjust them to the varying lengths of T-5 and the previous T-8 or T-10 lamps.

Likewise, one should be able to fix the arrangement of the cushioned plug pins on the printed circuit board at various intervals for the same reason.

The arrangement of electronic components which provide the option of operating the T-5 lamps with direct current, is recommended as per the invention for reducing the effect of ensuing interfering voltage.

The positioning of a reflector in such a way that it can serve its purpose reliably when changing the lamp is of great importance as per this invention. It is recommended that the reflector be attached directly on the T5-lamp, in order to be able to push in the same with the T-5 lamp together in the external tube.

The following illustrations should show the advantage of the invention, without restricting in any way the direct protection area shown in the pictures or descriptions.

DETAILED DESCRIPTION OF THE PREFERRED EMBODIMENT

Figure 3:
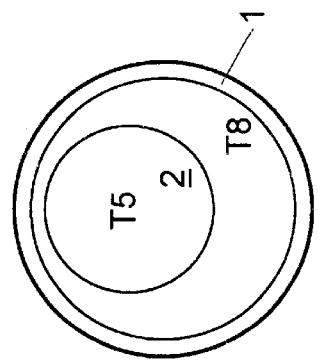
FIGS. 1 to 3: Schematic representation of the cross-section of various tube profiles.
Figure 2:
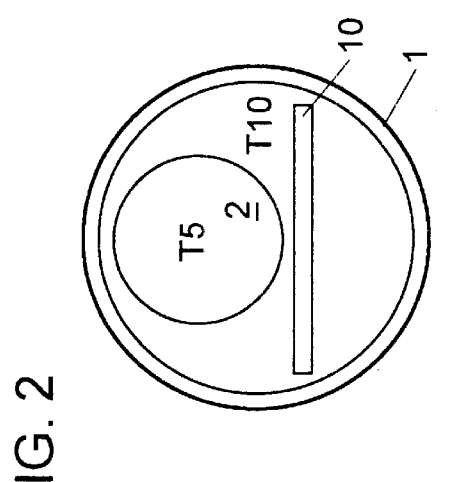
Figure 1:
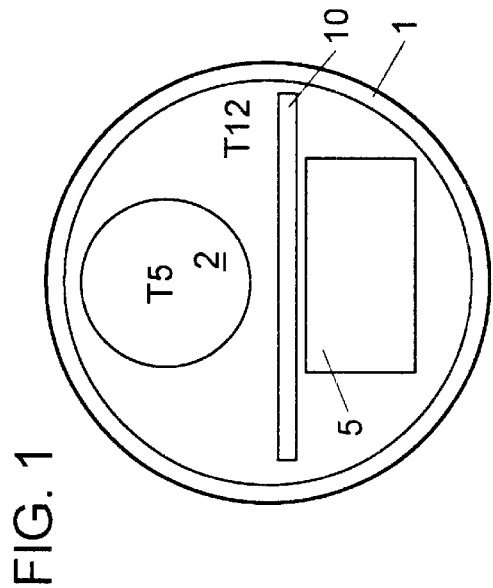

The standard comparison in FIG. 1 to FIG. 3 of external tubes with dimensions of T12-, T10- and T8-lamps with the new T5-lamps shows clearly the space available for fitting the necessary electronic components (5) on a printed circuit board (10).

Figure 4:
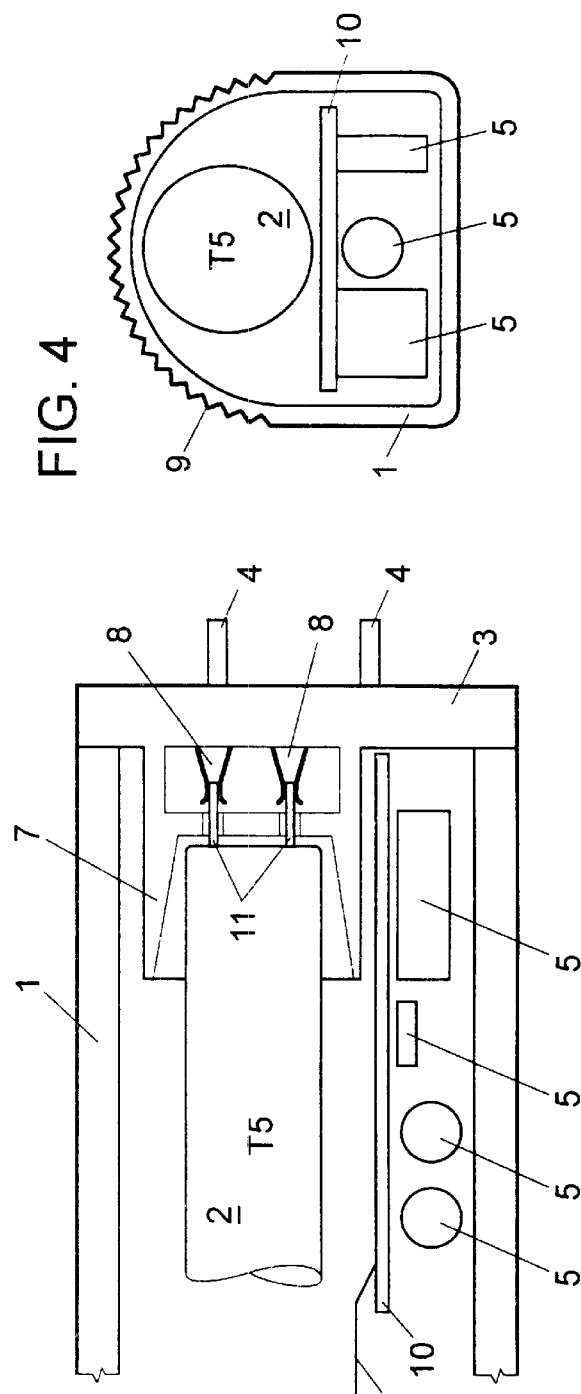
FIG. 4: Example of a polygon cross-section of the external tube.

FIG. 4 shows an external tube (1), which evinces a corrugation/ribbing pattern in the area of the light discharge, which leads to an improved light dispersion but is formed in the lower area as a polygon in order to create more space for the components (5) of the electronics. The ribbing/serrations can be naturally provided also on the inner surface of the external tube (1) in order to be able to clean the tube better.

Figure 5:
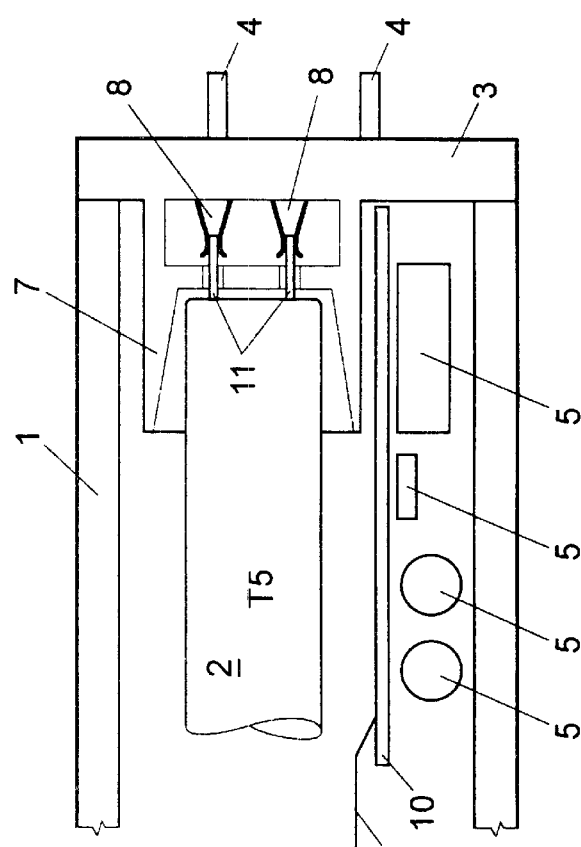
FIG. 5: Schematic arrangement of first embodiment of a complete illumination body as per the invention.
Figure 7:
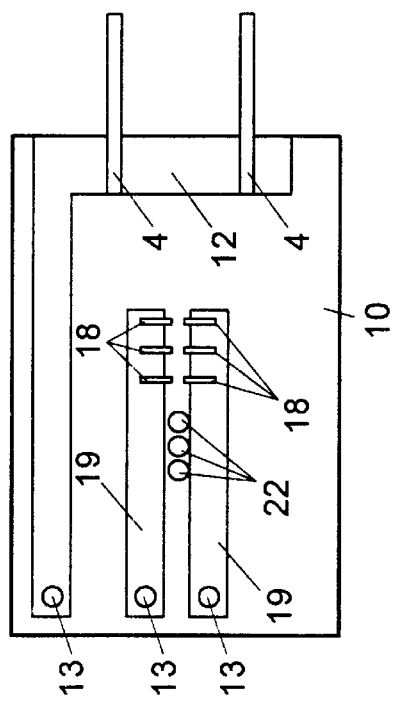
FIG. 7: A view of the printed circuit board of FIG. 6 without electronic components.

FIG. 5 shows schematically the right half of an arrangement of the individual parts of one embodiment of the invention. The external tube (1) is closed off by means of the insulation cap (3) and bears on the outside a pair of plug pins (4) for connection with the socket of the old lamps to be changed. A pair of plug contacts (8) accept a pair of pins (11) of the T5 lamp. The funnel-shaped receptacle (11) makes it easier to plug in the T5-lamp in the plug contacts (8).

The electronic components (5) are arranged on the printed circuit board (10) which can be firmly connected to the insulation cap (3). The printed circuit board (10) also bears the necessary connection pieces (6), which lead to the second insulation cap (3) at the other end of the external tube (1).

The connection between external tube (1) and the insulation caps (3) should be made as per the invention in the manner of a snap-shut connection, which can be removed only with a tool, in order to meet the specifications. It is also useful to define the position of the insulation cap (3) to the external tube (1) through stoppers, so that the position of the T5 lamp is fixed. These details are left to the designer, since there are endless variations possible.

An especially simple design of a semi-light-fitting as per the invention is shown in FIGS. 6–9. In this embodiment, all the parts required are positioned on the printed circuit boards (10) on which the plug pins (4) are either soldered or screwed on. The plug pins (4) protrude through holes in the insulation cap (3). The conduction paths (12) which short-circuit/close both neighboring plug pins (4) lead to a wiring connection (13) in order to connect the necessary connection pieces (6) to the printed circuit board (10) at the other end of the external tube (1).

Figure 6:
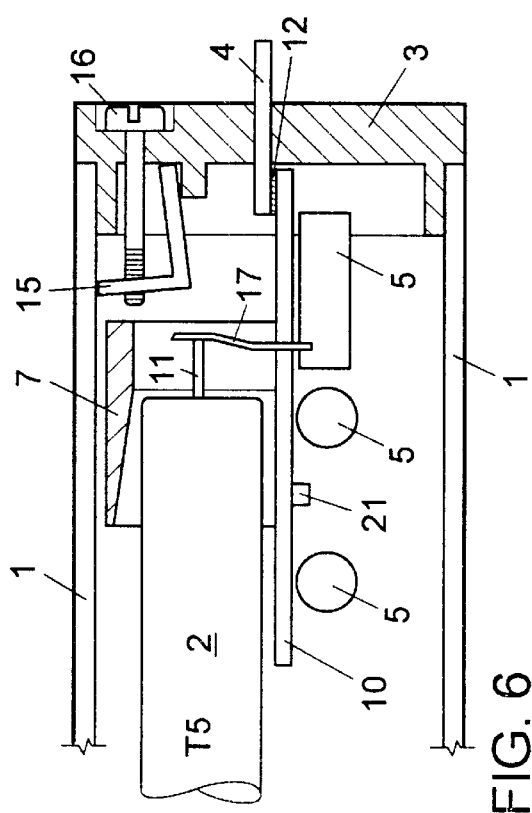
FIG. 6: A sectional representation of a second embodiment showing the end of an external tube with a T-5 lamp.

In FIG. 6 the removable insulation cap (3) is shown, which can be pulled away from external tube (1) when changing the T-5 lamp by loosening bolts (15). The loosening or tightening of the bolts (15) is carried out by means of a screw (16) which is seated in the insulation cap. In principle it is sufficient if one single bolt (15) is provided for securing cap (13) but it is also possible, if wished, to have several such bolts. Other means of attachment can also be considered as providing a similar solution.

Referring now to FIG. 6, as is already known, the lengths of the T-5 lamps are shorter than the lamps with same wattage of the corresponding T-8, T-10 or T-12 lamps. Unfortunately the lengths differ. They fluctuate between 40, 45 and 50 mm. Therefore it is recommended as per the invention, to preferably make the cushioned contacts (17) pluggable into holes (18) which are each displaced by 5 mm. Then one can construct all the different lengths with the same printed circuit board (10) by soldering the contacts (17) into the corresponding holes (18) of the printed circuit board. The circuit path (19) also leads to wire connections (13).

A similar type of length-adjusting device as described for the contacts (17) is also recommended for the funnel-shaped receptacles (7) as per the invention, which are inserted with adjusting pins (21) in corresponding holes (22)—corresponding to the position of the contacts (17)—in the printed circuit board (10).

Figure 9:
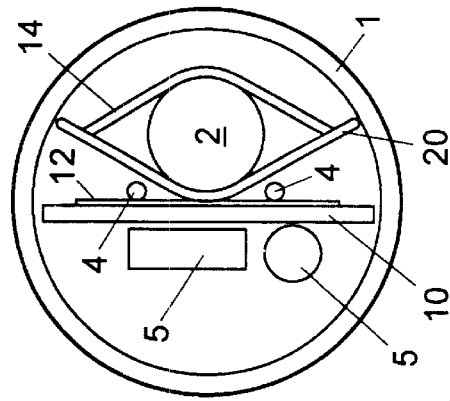
FIG. 9: Cross-section of an external tube with installed T-5 lamp.
Figure 8:
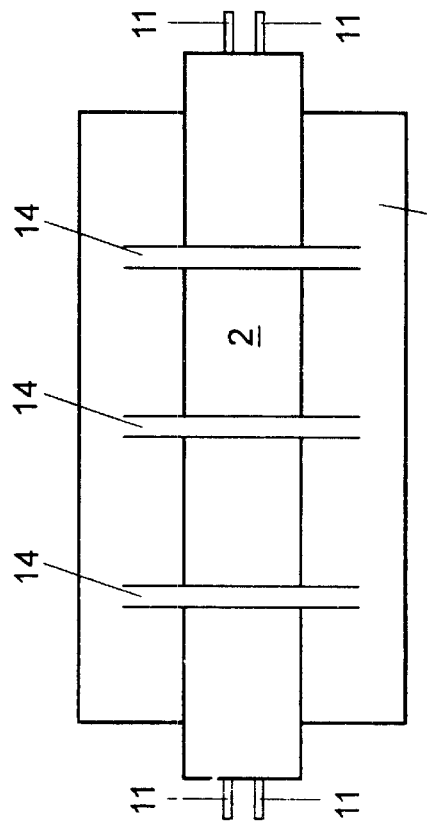
FIG. 8: A shortened representation of a T-5 lamp with reflector on top.

A special problem is the positioning of a reflector (20), which orients the radiation of light in one direction. A stabilization is necessary along the large length of the lamps. Therefore a reflector (20) is recommended, which can initially be mounted on the T5 lamp and then pushed in with the lamp T5 in to the external tube. There is a very simple solution as per the invention, as shown in FIGS. 8 and 9. Straps (14), fashioned from a reflecting material, are punched and pushed up in the manner shown, wrapped around the T5 lamp. A certain elasticity is a prerequisite for straps (14) and then the reflector sits snugly on the T5 lamp. This is shown schematically on a shortened lamp T5 in FIG. 8.

Various electronic components are drawn in FIGS. 6 and 9, which can all be installed on the non-removable, fixed printed circuit board at the other end of the external tube (1). This simplifies the removable printed circuit board (10) considerably and when the lamp is being changed no sensitive electronic components (5) are damaged.

The positioning of electronic components, which make the operation of the semi-fittings possible with direct current also have special importance. The electro-magnetic, high-frequency waves radiated, which in the case of lamps with luminous substances having electronic power supply units mainly lie between 35 to 50 kHz, are disturbing and not desired. One can in the case of the new complete lights reduce the radiation in the mains by providing electronic filters and conducting off earth potential. This measure is not possible in the case of subsequently fitted system, since there is no earth potential at the pins of the lamp available. A simple and basic solution lies therein that one operates the lamp with direct current.

Since one is dealing with a solution based on a principle with regard to this invention, there are also many other variations in design possible. The figures shown can therefore be considered as schematic examples, which show the wide range of direct circumference of protection.

What is claimed is:

1. An adapter for fitting a T5 fluorescent light having a pair of longitudinally extending pins at each end thereof into a light holder designed for larger-diameter fluorescent lamps, said adapter comprising:
   a pair of end caps on said adapter, each end cap having:
     exterior pins for mounting the adapter into sockets on the large-diameter light holder, and
     an interior socket for mounting the T5 fluorescent light to said adapter;
   a circuit board mounted within said adapter, said circuit board comprising electronic components for operating said T5 fluorescent lamp;
   a pair of electrical contacts on said circuit board for mating with the pins of one end of said T5 fluorescent lamp upon insertion of the lamp into the adapter; and
   slots in said circuit board for adjusting the location of said electrical contacts in accordance with the length of the T5 lamp.

2. The adapter of claim 1 comprising a pair of end caps and a translucent tubular member having a cross-sectional diameter of 1 inch, 1⅛ inches or 1½ inches, and means for inserting a T5 lamp within said tubular member.

3. The adapter of claim 2 wherein the diameter of said end caps is less than or equal to the diameter of said translucent tubular member.

4. The adapter of claim 2 wherein said translucent tubular member contains ridges.

5. The adapter of claim 1 wherein said pair of electrical contacts on the circuit board are movable in an axial direction and an end cap adjacent said electrical contacts comprises a funnel-shaped receptacle for guiding the pins at one end of a T5 lamp into physical contact with said electrical contacts.

6. An adapter for fitting a T5 fluorescent light into a light holder designed for larger-diameter fluorescent lamps, said adapter comprising:
   a pair of end caps on said adapter, each end cap having:
     exterior pins for mounting the adapter into sockets on the large-diameter light holder, and
     an interior socket for mounting the T5 fluorescent light to said adapter; and
   a removable reflector having a plurality of straps for mounting said reflector to a T5 fluorescent lamp prior to insertion of said lamp into said holder.

7. The adapter of claim 6 comprising a pair of end caps and a translucent tubular member having a cross-sectional diameter of 1 inch, 1⅛ inches or 1½ inches, and means for inserting a T5 lamp and mounted reflector within said tubular member.

8. The adapter of claim 7 wherein the diameter of said end caps is less than or equal to the diameter of said translucent tubular member.

9. The adapter of claim 2 wherein said translucent tubular member contains ridges.

10. An adapter for fitting a T5 fluorescent light into a light holder designed for larger-diameter fluorescent lamps, said adapter comprising:

a pair of end caps on said adapter, each end cap having:
  exterior pins for mounting the adapter into sockets on the large-diameter light holder, and
  an interior socket for mounting the T5 fluorescent light to said adapter;

wherein at least one of said end caps comprises means for varying the spacing between said end cap exterior pins and said end cap interior socket to accommodate T5 lamps of varying lengths.

11. The adapter of claim 10 comprising a pair of end caps and a translucent tubular member having a cross-sectional diameter of 1 inch, 1⅛ inches or 1½ inches, and means for inserting a T5 lamp within said tubular member.

12. The adapter of claim 11 wherein the diameter of said end caps is less than or equal to the diameter of said translucent tubular member.

13. The adapter of claim 10 wherein said translucent tubular member contains ridges.

* * * * *